US007097770B2

(12) United States Patent
Lysenko et al.

(10) Patent No.: US 7,097,770 B2
(45) Date of Patent: Aug. 29, 2006

(54) SEPARATION OF PLANT OIL TRIGLYCERIDE MIXTURES BY SOLID BED ADSORPTION

(75) Inventors: Zenon Lysenko, Midland, MI (US); Sanjeev Katti, Acton, MA (US); Richard Stringfield, Midland, MI (US); Thomas Gregory, Midland, MI (US); George J. Quarderer, Jr., Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 402 days.

(21) Appl. No.: 10/471,875

(22) PCT Filed: Mar. 21, 2002

(86) PCT No.: PCT/US02/08708

§ 371 (c)(1), (2), (4) Date: Sep. 12, 2003

(87) PCT Pub. No.: WO02/086039

PCT Pub. Date: Oct. 31, 2002

(65) Prior Publication Data

US 2004/0094477 A1 May 20, 2004

Related U.S. Application Data

(60) Provisional application No. 60/285,464, filed on Apr. 20, 2001.

(51) Int. Cl.
*B01D 15/08* (2006.01)
*C11B 7/00* (2006.01)

(52) U.S. Cl. ...................... 210/656; 210/659; 210/660; 210/661; 210/680; 554/191; 554/193

(58) Field of Classification Search ................ 210/638, 210/656, 659, 670–671, 660, 661, 679, 680; 554/9, 12, 14, 20, 191, 193, 219; 426/430, 426/601, 629, 634
See application file for complete search history.

(56) References Cited

U.S. PATENT DOCUMENTS 1,767,041 A * 6/1930 Billing ...................... 510/437
2,553,288 A * 5/1951 Young et al. ............... 554/168

(Continued)

FOREIGN PATENT DOCUMENTS

EP A1-0062114 10/1982

(Continued)

OTHER PUBLICATIONS

Nicki Engeseth et al, "Desaturation of oxygenated fatty acids in Lesquerella and other seed oils", Planta Journal (1996) vol. 198, pp. 238-245., downloaded from the internet Apr. 4, 2006.*

(Continued)

*Primary Examiner*—Joseph Drodge
(74) *Attorney, Agent, or Firm*—Marie F. Zuckerman

(57) ABSTRACT

A solid bed adsorptive process for separating a seed oil into two substantially pure triglyceride fractions. The process involves contacting a seed oil, such as castor oil, preferably as a concentrate, with an adsorbent in a bed, the adsorbent having a particle size greater than about 40 microns, and thereafter contacting the adsorbent with a desorbent material, preferably under minimal flow conditions, to obtain a raffinate output stream containing predominantly a second triglyceride and an extract output stream containing predominantly a first triglyceride. Purified fatty acid triglyceride esters obtainable from castor, vernonia, and lesquerella plant oils provide renewable, non-petroleum-based sources of chemical feedstocks.

24 Claims, 2 Drawing Sheets

U.S. PATENT DOCUMENTS

| | | | | | |
|---|---|---|---|---|---|
| 2,581,369 | A | * | 1/1952 | Bernhard et al. | 554/116 |
| 2,985,589 | A | | 5/1961 | Broughton et al. | |
| 3,165,540 | A | | 1/1965 | Krewson et al. | |
| 3,173,935 | A | * | 3/1965 | Singleton | 554/194 |
| 3,647,684 | A | * | 3/1972 | Malcolm | 210/658 |
| 4,210,594 | A | | 7/1980 | Logan et al. | |
| 4,213,913 | A | | 7/1980 | de Rosset | |
| 4,297,292 | A | | 10/1981 | Logan et al. | |
| 4,402,832 | A | | 9/1983 | Gerhold | |
| 4,770,819 | A | | 9/1988 | Zinnen | |
| 4,961,881 | A | | 10/1990 | Ou | |
| 5,068,418 | A | | 11/1991 | Kulprathipanja et al. | |
| 5,225,580 | A | | 7/1993 | Zinnen | |
| 5,300,242 | A | * | 4/1994 | Nichols et al. | 508/460 |
| 5,414,100 | A | * | 5/1995 | Ayorinde et al. | 554/191 |
| 5,719,302 | A | * | 2/1998 | Perrut et al. | 554/191 |

FOREIGN PATENT DOCUMENTS

| | | |
|---|---|---|
| EP | A1-0367877 | 5/1990 |

OTHER PUBLICATIONS

Robert Kleiman, Chemistry of New Industrial Oilseed Crops:, 1990, In: J. Janick and J.E. Simon (eds.), Advances in new crops, Timber Press, Portland, OR., downloaded from the internet Apr. 4, 2006.*

A.T. James, "The Biosynthesis of Ricinoleic Acid", Unilever Research Laboratory, Colworth House, Sharnbrook, Bedford, Biocherm. J. (1965) vol. 95, pp. 448-452, downloaded from the internet Apr. 4, 2006.*

Patent Abstracts ofJapan, vol. 015, No. 256 (JP 03084099—Published Sep. 4, 1991).

* cited by examiner

SEPARATION OF PLANT OIL TRIGLYCERIDE MIXTURES BY SOLID BED ADSORPTION

CROSS-REFERENCE TO RELATED APPLICATIONS

This application is 371 of International Patent Application No. PCT/US02/08708, filed Mar. 21, 2002, which claims the benefit of U.S. Provisional Patent Application Ser. No. 60/285,464, filed Apr. 20, 2001.

This invention pertains to a solid bed adsorptive separation of triglyceride mixtures, specifically triglyceride mixtures obtainable from plant oils.

Triglyceride fatty acid esters derived from plant oils, such as the oils of the castor, vernonia, and lesquerella plants, can provide a renewable source of non-petroleum-based chemical feedstocks. Unsaturated, long-chain fatty acid esters obtainable from castor oil, such as the glycerides of ricinoleic acid, for example, can be metathesized with lower olefins, such as ethylene, to produce reduced chain α-olefins, such as 4-hydroxy-1-decene, and reduced chain α-olefins having terminal ester functionalities, such as the terminal diglyceride and triglyceride esters of α-decenoate. The unsaturated ester can be oxidatively cleaved to produce the corresponding α,ω-unsaturated carboxylic acid. α-Olefins and ester or acid-functionalized α-olefins find utility as monomers in the manufacture of poly(olefins) and as chain extenders in thermoset resins. Alternatively, α-olefins can be converted into the corresponding α-epoxides, which also find utility in the manufacture of thermoset resins. In the case of triglycerides separated from castor oil, the corresponding α-olefin metathesis products can be converted into diepoxides and triepoxides, which are highly useful in preparing epoxy resins.

In order to obtain the benefit of plant oils as a renewable source of chemical feedstocks for the polymer industry, the plant oils must first be separated into substantially pure fractions of their component triglyceride fatty acid esters. In the past, solid bed adsorptive chromatography and high pressure liquid chromatography have been employed to separate mixtures. Typically, these separation methods involve applying a dilute solution of a feed mixture to an adsorbent bed, and thereafter eluting a large quantity of desorbent material through the bed under desorptive conditions sufficient to separate the components of the feed mixture and recover a substantially pure stream of each component. To obtain a high degree of separation, the adsorbent is generally provided in a small particle size, typically less than about 30 microns (μm). When a small adsorbent particle size is employed in an industrial scale adsorptive bed, the small particles disadvantageously produce a significant pressure drop down the adsorbent bed, which can result in plugging, premature over-saturation of the upstream end of the bed, and flow problems. In another aspect of the prior art process, the dilute feed solution applied to the adsorbent typically contains from about 0.1 to about 10 percent feed mixture by volume, based on the total volume of feed mixture and solvent Typically too, the volume ratio of desorbent to feed mixture is greater than about 1000/1. Accordingly, these traditional adsorptive bed processes require equipment designed to handle large quantities of liquid solvents and desorbents. The cost and complexity of such an operation are high, as compared with the quantity of extract recovered. Due to these inherent disadvantages, adsorptive bed methods for separating a feed mixture typically are conducted on a small analytical laboratory scale, but are not suitably employed for large industrial scale operations.

U.S. Pat. No. 4,770,819 discloses a process of separating diglycerides from triglycerides employing a lithium, potassium, or hydrogen ion-exchanged omega zeolite or silica adsorbent. It is taught that the diglyceride is selectively adsorbed to the substantial exclusion of the triglyceride. The adsorbent is disclosed to have a particle size ranging from about 16 to about 60 US mesh (from about 1,305 microns (μm) to about 250 μm). The process is also disclosed to be adaptable to a moving bed or simulated moving bed flow system, and to be adaptable to commercial scale units. U.S. Pat. No. 4,770,819 is silent with regard to separating a mixture of triglycerides.

In view of the above, it would be desirable to discover a solid bed adsorptive method for separating mixtures of triglycerides derived particularly from plant oils, such as castor, vernonia, and lesquerella plant oils. It would be more desirable if such a process did not require a small adsorbent particle size; but instead could provide an acceptable degree of separation with a large adsorbent particle size adaptable to industrial scale unit operations. It would be even more desirable if such a process employed relatively small quantities of solvent and desorbent as compared with prior art processes, which would have the effect of decreasing the size, complexity, and cost of the equipment required for the process. Finally, it would be most desirable, if the separation was efficient, so as to yield substantially pure fractions of the triglyceride components of the mixture. A solid bed adsorptive process having all of the aforementioned properties could be beneficially employed to obtain substantially pure fractions of useful fatty acid esters from plant oils, rendering these oils a good source of renewable, non-petroleum-based chemical feedstocks.

SUMMARY OF THE INVENTION

The present invention provides for a novel process of separating a mixture of triglyceride esters obtainable from plant oils. The process comprises contacting a seed oil, whose fatty acid composition is comprised predominantly of one principle fatty acid selected from ricinoleic, vernolic, and lesquerolic acids, at adsorption conditions with an adsorbent in a bed, the adsorbent having a particle size greater than about 40 microns. In the process of this invention, a first triglyceride product, characterized as having three fatty acids, each identical to the principle fatty acid in the oil, is adsorbed more selectively by the adsorbent, as compared with a second triglyceride product. The second triglyceride product is characterized as having either of two, one, or no fatty acids identical to the principle fatty acid in the oil. The second triglyceride product is removed before the first triglyceride product by withdrawing from the adsorbent a raffinate stream comprising predominantly the second triglyceride product, after which a purified second triglyceride product may be obtained from the raffinate stream. After withdrawing the second triglyceride product, the first triglyceride product is desorbed. The desorption of the first triglyceride product is effected by contacting the adsorbent containing the first triglyceride product with a desorbent under desorbent conditions sufficient to yield an extract stream comprising predominantly the first triglyceride product and desorbent, from which a purified first triglyceride product may be obtained. The terms "desorbent," "raffinate stream," and "extract stream," as well as other technical terms used in connection with this invention, are defined and described in detail hereinafter.

In the unique process of this invention, a seed oil comprising a mixture of triglyceride esters, obtainable, for example, from castor, vernonia, and lesquerella plants, is separated into two purified triglyceride fractions. Advantageously, the process of this invention employs a large adsorbent particle size, which allows the process to be used in industrial scale unit operations without an undesirable pressure drop down the adsorbent bed. More advantageously, in preferred embodiments the process of this invention applies a high concentration of feed oil to the adsorbent bed, which reduces the quantity of solvent needed when applying the feed to the bed. Even more advantageously, in a preferred embodiment targeted for industrial scale, the process of this invention may employ a minimal desorbent flow, as compared with prior art processes. The use of minimal solvent and minimal desorbent flow advantageously reduces the size of the equipment required, its cost, and the complexity of processing the liquid phases. All of the aforementioned advantages make the process of this invention more adaptable to industrial scale separations. Accordingly, the process described herein provides for an attractive method of obtaining purified triglycerides, useful in polymer applications, from plant oils, which are a renewable source of non-petroleum-based chemical feedstocks.

DETAILED DESCRIPTION OF THE INVENTION

Figure 1:
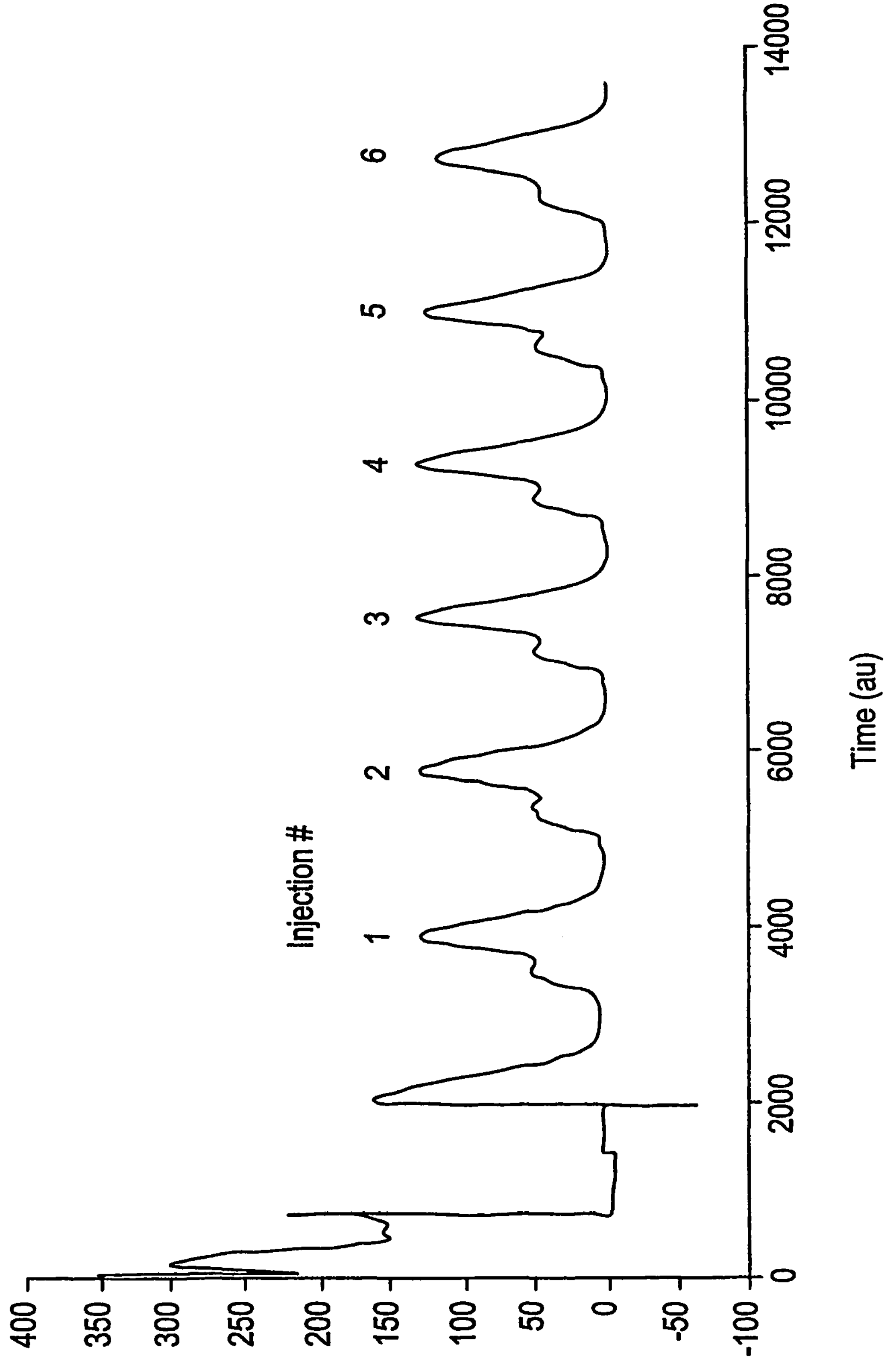
FIG. 1 is a chromatographic trace of a refractive index detector output as a function of time for a pulse test described in Example 1, illustrating the separation of castor oil on silica with a desorbent comprising ethyl acetate and n-hexane.

In the novel process of this invention, a seed oil comprising a mixture of triglycerides is separated by a solid bed adsorptive method into two purified triglyceride fractions. The novel process comprises contacting a seed oil whose fatty acid composition comprises predominantly one principle fatty acid selected from ricinoleic, vernolic, and lesquerolic acids, at adsorption conditions with an adsorbent in a bed, the adsorbent having a particle size greater than about 40 microns. The term “predominantly” in this instance shall be taken to mean greater than about 50 weight percent, based on the total weight of fatty acids. In the process of this invention, a first triglyceride product (homogenous product), characterized as having three fatty acids each identical to the principle fatty acid in the oil, is selectively adsorbed as compared with a second triglyceride product. The second triglyceride product (heterogeneous product) is characterized as having either two, one, or no fatty acids identical to the principle fatty acid in the oil. In a preferred embodiment, the second triglyceride product is characterized as having two fatty acids identical to the principle fatty acid in the oil and a third fatty acid selected from any fatty acid in the oil exclusive of the principle fatty acid. In the process of this invention, the second triglyceride product is removed before the first triglyceride product by withdrawing from the adsorbent a raffinate stream comprising predominantly the second triglyceride product, as described hereinafter. The second triglyceride product may then be obtained in substantially pure form from the raffinate stream, if desired. After withdrawing the raffinate stream, the first triglyceride product is desorbed by contacting the adsorbent containing the first triglyceride product with a desorbent under desorbent conditions sufficient to yield an extract stream comprising predominantly the first triglyceride product and desorbent, as described hereinafter. A substantially pure first triglyceride product may be obtained from the extract stream, if desired.

In a preferred embodiment of this invention, a seed oil having a fatty acid composition comprising greater than about 50 weight percent ricinoleic acid, obtainable from the seeds of castor plants, is separated by a solid bed adsorptive method into two substantially pure triglyceride fractions, these being triricinolein and diricinolein. Triricinolein is derived from three ricinoleic fatty acid molecules; whereas diricinolein is derived from two ricinoleic fatty acid molecules and a third fatty acid molecule selected from any fatty acid present in the castor oil exclusive of ricinoleic acid. In this preferred embodiment, the process comprises contacting the aforementioned seed oil obtainable from the castor plant at adsorption conditions with an adsorbent in a bed, the adsorbent having a particle size greater than about 40 microns. In this preferred embodiment, triricinolein is selectively adsorbed as compared with diricinolein. Accordingly, diricinolein is removed before triricinolein by withdrawing a raffinate stream comprising predominantly diricinolein from the adsorbent. The diricinolein may then be obtained in substantially pure form from the raffinate stream, if desired. After withdrawing the raffinate stream, the triricinolein is desorbed by contacting the adsorbent containing the triricinolein with a desorbent under desorbent conditions sufficient to yield an extract stream comprising predominantly triricinolein and desorbent. A substantially pure triricinolein may be obtained from the extract stream, if desired.

In another preferred embodiment of this invention, the adsorbent has a particle size greater than about 70 μm (210 US mesh). In a more preferred embodiment, the adsorbent is silica having a particle size greater than about 70 μm (211 US mesh) and less than about 800 μm (22 US mesh). In yet another preferred embodiment of this invention, the process is conducted in a moving bed or simulated moving bed flow system, as referenced hereinafter.

As described hereinabove, this invention comprises the separation of a seed oil into triglyceride products. One product is a triglyceride having three fatty acids identical to the principal fatty acid component of the seed oil. The second product is a triglyceride having either of two, one, or no fatty acids identical to the principle fatty acid component of the feed oil. In a preferred embodiment, the second triglyceride product has two fatty acids identical to the principal fatty acid component of the seed oil and a third fatty acid selected from any fatty acid present in the seed oil exclusive of the principal fatty acid. In a related concept of this invention, the separation may likewise be effected when the second product is a triglyceride having only one fatty acid identical to the principal fatty acid component of the seed oil and two fatty acids each individually selected from fatty acids present in the seed oil exclusive of the principal fatty acid. In another related concept of this invention, the separation may likewise be effected when the second product is a triglyceride having three fatty acids each individually selected from any fatty acid present in the seed oil exclusive of the principal fatty acid. In this alternative embodiment, the second triglyceride product contains none of the principal fatty acid. Hereinafter, the invention is described for the specific application involving separating a seed oil into a first triglyceride product having three fatty acids identical to the principal fatty acid and a second triglyceride product having two fatty acids identical to the principal fatty acid and a third fatty acid selected from any fatty acid present in the seed oil exclusive of the principal fatty acid. Based on the detailed description herein, one skilled in the art will easily recognize how to conduct the process of this invention so as to separate a first triglyceride product having three fatty acids identical to the principal fatty acid and a second triglyceride product having only one principal fatty acid or none of the principal fatty acid.

The seed oil employed in the process of this invention may be any seed oil whose fatty acid composition comprises predominantly one principle fatty acid selected from ricinoleic, vernolic, and lesquerolic acids. As noted hereinbefore, the term "predomimantly" in this instance means greater than about 50 weight percent of the principle fatty acid. Preferably, the fatty acid composition of the seed oil comprises greater than about 70 weight percent of one principle fatty acid selected from ricinoleic, vernolic, and lesquerolic acids, and more preferably, greater than about 85 weight percent of one principle fatty acid selected from ricinoleic, vernolic, and lesquerolic acids. Typically, seed oils meeting this criterion include the seed oils obtained from the castor, vernonia, and lesquerella plants. These plants are cultivated and found naturally, particularly in tropical habitats in India and Africa. Any grade of such oils may be employed in the process of this invention, including crude oils as well as oils that have been refined, bleached, and/or deodorized.

To be more specific, castor oil comprises a mixture of two types of triglycerides, each derived from the condensation of glycerol, a trihydric alcohol, with three fatty acids. In one of the triglyceride components "triricinolein," glycerol is esterified with three molecules of ricinoleic acid (12-hydroxy-cis-9-octadecenoic acid), in this instance the principle fatty acid. In the second triglyceride component "diricinolein," glycerol is esterified with two molecules of ricinoleic acid. The third hydroxyl functionality in diricinolein is esterified with any other fatty acid typically present in castor oil exclusive of ricinoleic acid. The third fatty acid is preferably selected from oleic and palmitic acids. A typical castor oil composition comprises the following: ricinoleic acid, from about 85 to about 90 percent; linolenic acid, from about 3 to about 5 percent; oleic acid, from about 2 to about 5 percent; palmitic acid, from about 1 to about 3 percent; stearic acid, from about 1 to about 2 percent; and dihydroxy stearic acid of about 1 percent (±0.3), by weight. Castor oil is obtainable from the beans of the castor plant (*Ricinus communis*).

Likewise, vernonia oil comprises a mixture of triglycerides derived from glycerol and fatty acids of the following typical composition by weight: vernolic acid, from about 60 to about 77 percent; linolenic acid, from about 0.1 to about 0.4 percent; linoleic acid, from about 9 to about 13 percent; oleic acid, from about 4 to about 20 percent; and stearic acid, from about 2 to about 4 percent. In vernonia oils, one triglyceride is derived from three vernolic acid molecules (12,13-epoxy-cis-9-octadecenoic acid), in this instance the principle fatty acid. A second triglyceride in vernonia oil contains two vernolic acids and a third fatty acid obtained from any of the other fatty acids present in vernonia oil exclusive of vernolic acid. Vernonia oil is obtainable from several plant species including, for example, *Vernonia hymenolepsis, Vernonia galimensis, Stokesia lavis*, and *Euphorbia lagasae.*

In like manner, lesquerella oils comprise a mixture of triglycerides derived from glycerol and fatty acids having the following typical composition by weight: lesquerolic acid, from about 10 to about 75 percent; linolenic acid, from about 1 to about 13 percent; linoleic acid, from about 3 to about 8 percent; oleic acid, from about 11 to about 27 percent; stearic acid, from about 1 to about 6 percent; and palmitic acid, from about 1 to about 6 percent. More specifically, it is lesquerella oils containing greater than about 50 weight percent of lesquerolic acid that are used in the process of this invention. One triglyceride present in lesquerella oil is derived from three molecules of lesquerolic acid (14-hydroxy-cis-11-eicosenoic acid), that being the principle acid in this instance. The second triglyceride present in lesquerella oil contains two lesquerolic acids and a third fatty acid selected from any other fatty acids present in the oil exclusive of lesquerolic acid. Lesquerella oil is obtainable from several plant species including, for example, *L. densipilia* and *L. fendleri.*

In the following more detailed description of the invention, a variety of terms will be used, which for the sake of clarity are defined hereinafter. The term "feed mixture" shall indicate a seed oil which comprises a mixture of triglycerides from which at least one extract component and one raffinate component can be obtained, as noted hereinbelow. As described hereinabove, the fatty acid composition of the seed oil shall also comprise greater than about 50 weight percent of one principle fatty acid selected from ricinoleic, vernolic, and lesquerolic acids. The term "feedstream" shall indicate a stream comprising a seed oil that is passed to the adsorbent in this process. An "extract component" shall refer to a component of the feed mixture that is more selectively adsorbed by the adsorbent; while a "raffinate component" shall refer to a component of the feed mixture that is less selectively adsorbed by the adsorbent. These definitions of extract and raffinate components are consistent with general chemical lexicography wherein an "extract" is defined as a solution that contains an extracted solute, and a "raffinate" is defined as a residual feed solution after one or more constituents have been removed by extraction. (Refer, for example, to *Chemical Engineer's Handbook*, 5$^{th}$ ed., by Robert H. Perry, McGraw-Hill Book Company, 1973, Chapter 15, p. 2.) Accordingly, in the process of this invention, the extract component is the first triglyceride product (homogeneous triglyceride), characterized as having three fatty acids identical to the principle fatty acid in the oil. In the process of this invention, the raffinate component is the second triglyceride product (heterogeneous triglyceride), preferably, characterized as having two fatty acids identical to the principle fatty acid in the oil and a third fatty acid selected from any of the other fatty acids in the oil exclusive of the principle fatty acid. The term "extract stream" shall mean a stream through which the extract component, which has been desorbed, is removed from the adsorbent. The term "raffinate stream" shall mean a stream through which the raffinate component is removed from the adsorbent. The term "desorbent material" shall generally refer to one or more liquid compounds that are capable of desorbing an extract component from the adsorbent. The "desorbent input stream" indicates the stream through which the desorbent passes into the adsorbent. Since the extract stream and raffinate stream will contain some quantities of desorbent material, it is typically the case that the extract and raffinate streams are individually subjected to a separation means, such as fractional distillation, to remove the desorbent material and to obtain substantially pure fractions of triglycerides. Accordingly, the terms "extract product" and "raffinate product" shall refer to the products produced, herein first and second triglyceride products, respectively, on removing the desorbent from the extract stream and the raffinate stream. Alternatively, the extract stream and raffinate stream may be employed directly in downstream operations without removal of the desorbent and without isolation of the purified extract and raffinate products.

In accordance with the process of this invention, the seed oil, comprising a mixture of triglycerides, can be applied to the adsorbent as a neat liquid. Alternatively, if desired, the oil can be applied in solution to the adsorbent. If a solution is employed, then any solvent can be used, provided certain criteria are generally satisfied. To be specific, the solvent should be capable of dissolving the oil to form a homogenous solution. Also, the solvent should be substantially inert, that is, substantially non-reactive with any of the oil components. The solvent should also not interfere with the separation method; for example, the solvent should not selectively bind to the adsorbent such that the solvent substantially blocks the adsorption of the extract component to the adsorbent. Additionally, since it may be desirable for the solvent to be removed from the raffinate and extract streams, the solvent may be selected to be easily separable from the raffinate and extract streams by simple conventional means, for example, by fractional distillation. Solvents that typically possess these properties include, without limitation, aliphatic hydrocarbons, such as pentane, hexane, heptane, cyclohexane, and octane, including the various isomers thereof; aromatic hydrocarbons, such as benzene, toluene, and ethylbenzene; chlorinated aliphatics and aromatics, such as methylene chloride, chloroform, and chlorobenzene; polar solvents, including alcohols, such as methanol, ethanol, i-propanol, butanols, amyl alcohol, and glycols; esters, such as, ethyl acetate and butyl acetates; ethers, such as, diethyl ether and diisopropyl ether; and ketones, such as, acetone and methyl ethyl ketone, and the like. Mixtures of any of the aforementioned solvents, preferably, mixtures of non-polar and polar solvents, can also be employed, and may be preferred, because fatty acid triglyceride esters have both non-polar and polar constituents. More preferably, the solvent is a mixture of a $C_{1-10}$ aliphatic hydrocarbon and a $C_{1-6}$ acetate, even more preferably, a mixture of n-hexane and ethyl acetate.

If a mixture of solvents is used, then the relative quantities of solvents in the solvent mixture can be variable, so long as the solvent mixture possesses the attributes mentioned hereinbefore and functions to deliver the feed mixture to the adsorbent. The actual quantities of solvent components used can vary depending upon the specific solvents and specific feed mixture employed. For example, in a two solvent system, the concentration of each solvent component may range from greater than about 0 to less than about 100 volume percent, and preferably, from greater than about 10 to less than about 90 volume percent. One skilled in the art will know how to adjust the relative quantities of solvent components to optimize the solubility of the feed mixture therein. If a solvent or mixture of solvents is employed, then the concentration of the feed oil mixture in the solvent or solvent mixture can also vary widely, provided that the feed mixture is delivered to the adsorbent as desired. Generally, the concentration of the feed mixture in the solvent or solvent mixture is greater than about 50 volume percent, based on the total volume of the feed mixture plus solvent (s). Preferably, the concentration of the feed mixture in the solvent or solvent mixture is greater than about 70 volume percent, more preferably, greater than about 90 volume percent, even more preferably, greater than about 95 volume percent. In a most preferred embodiment, essentially no solvent is employed.

The adsorbent employed in the process of this invention may comprise any known adsorbent material, provided that the separation of the triglyceride mixture described herein yields substantially pure triglyceride fractions. Non-limiting examples of suitable adsorbent materials include silicas, aluminas, silica-aluminas, clays, crystalline porous metallosilicates including, for example, molecular sieves, zeolites, and mesoporous aluminosilicates; as well as reticular synthetic polymeric resins, such as cross-linked polystyrenes, including for example, divinylbenzene cross-linked polystyrenes. These adsorbents are commonly obtainable from commercial sources. Preferably, the adsorbent is silica, more preferably, silica gel. In a preferred embodiment, the adsorbent is porous, which means that it contains channels, pores, or cavities that provide access to the feed mixture and desorbent, and any solvent that may be used. Typically, the average pore size of the adsorbent is greater than about 45 Angstroms (Å), and preferably, greater than about 55 Å in diameter (or cross-sectional dimension in the case of a non-circular pore). Typically, the average pore size of the adsorbent is less than about 500 Å, and preferably, less than about 200 Å in diameter (or cross-sectional dimension).

The adsorbent used in the adsorptive separation process of this invention may be in the form of particles, such as spheres, aggregates, extrudates, tablets, granules, or other regular or irregular shapes and forms. Optionally, the adsorbent may be dispersed in a binder material or inorganic matrix for the purpose of agglomerating the adsorbent particles, which might otherwise be in a fine powder form. Additionally, the binder or matrix may strengthen the adsorbent particles. Refractory oxides, such as silica, alumina, or silica-alumina, may be suitably employed as the binder or inorganic matrix. Preferably, the binder or matrix is also a porous material, that is, a material containing channels, pores, and/or cavities therein, which enable liquid access to the adsorbent. Suitable pore sizes for the binder generally range from greater than about 45 Angstroms to less than about 200 Angstroms in diameter (or cross-sectional dimension).

With respect to particle size, it is commonly recognized that the smaller the adsorbent particle size, the better will be the separation of the components of the mixture. A large particle size, in contrast, is generally considered to produce poorer separation results. Accordingly, adsorbent particles on the order of about 30 microns or less are typically employed for analytical scale separations. Disadvantageously, however, the smaller the adsorbent particle, the larger the pressure drop down the adsorbent bed. In the case of an industrial scale separation unit, a small particle size can produce a significant pressure drop down the adsorbent bed, thereby creating flow problems, such as uneven flow rates, uneven flow distribution, and plugging. Unexpectedly, it has now been discovered that good separation of the triglyceride components of seed oils can be achieved when the adsorbent possesses a large particle size. Accordingly, the process of this invention is beneficially adaptable to commercial scale separation units.

With reference to the above, in the process of this invention the particle size of the adsorbent or the adsorbent-binder composite is typically greater than about 40 microns (μm) (less than about 368 US mesh), preferably, greater than about 70 μm (less than about 211 US mesh), and more preferably, greater than about 100 μm (less than about 149 US mesh) in diameter (or critical dimension in the case of non-spherical particles). Typically, the particle size of the adsorbent or adsorbent-binder composite is less than about 800 μm (greater than about 22 US mesh), and preferably, less than about 600 μm (greater than about 30 US mesh). The use herein of a large particle size, of greater than about 40 μm, and preferably, greater than about 70 μm, renders the process of this invention more adaptable to industrial scale units.

The desorbent material, which is used in the process of this invention, can be any fluid substance that is capable of removing the selectively adsorbed extract component from the adsorbent. In adsorptive separation processes, which are generally operated at substantially constant temperature and pressure that ensure liquid phase, the desorbent material relied upon is typically selected to satisfy several criteria. First, the desorbent material should be capable of displacing the extract component from the adsorbent with reasonable mass flow rates without the desorbent itself being so strongly adsorbed as to prevent the extract component from substantially displacing the desorbent in the following adsorption cycle. Secondly, the desorbent material should be compatible with the particular adsorbent and the particular feed mixture. Specifically, the desorbent should be substantially non-reactive with either the adsorbent or any component of the feed mixture, and should not substantially reduce or destroy the selectivity of the adsorbent for the extract component with respect to the raffinate component. It may be further desirable for the desorbent material to be readily separable from the feed mixture. After desorbing the extract component of the feed, both desorbent material and the extract component are typically removed in admixture from the adsorbent. Likewise, the raffinate component is typically withdrawn from the adsorbent in admixture with the desorbent material. If pure fractions of the extract and raffinate products are desired, then the desorbent material should be readily separated from the extract and raffinate components, for example, by simple fractional distillation. In this case, the desorbent material may be selected to have a boiling point that renders the desorbent readily separable. It may be, however, that the extract and raffinate streams are to be used directly in other downstream operations, and that the extract and raffinate products are not to be removed from the desorbent immediately. If so, then other factors determined by the integrated separation and downstream operations may influence the choice of desorbent, as designed by one skilled in the art.

Desorbents that typically possess the aforementioned properties include, without limitation, aliphatic hydrocarbons, such as pentane, heptane, hexane, cyclohexane, and octane, including the various isomers thereof; aromatic hydrocarbons, such as benzene, toluene, and ethylbenzene; chlorinated aliphatics and aromatics, such as methylene chloride, chloroform, and chlorobenzene; polar solvents, including alcohols, such as methanol, ethanol, isopropanol, butanols, amyl alcohol, and glycols; esters, such as ethyl acetate and butyl acetates; ethers, such as diethyl ether and diisopropyl ether; and ketones, such as acetone, and methyl ethyl ketone; and the like. Mixtures of any of the aforementioned desorbents, particularly mixtures of non-polar and polar desorbents, can also be employed, and may be preferred, since fatty acid esters have both non-polar and polar constituents. More preferably, the desorbent is a mixture of a $C_{1-10}$ aliphatic hydrocarbon and $C_{1-6}$ acetate ester, even more preferably, a mixture of n-hexane and ethyl acetate. In another preferred embodiment, the desorbent composition is identical to the solvent that is used to apply the feed mixture to the adsorbent.

If the desorbent is a mixture of liquids, then the relative quantities of each component of the desorbent mixture can vary, so long as the desorbent mixture functions in a satisfactory manner as described hereinabove. Generally, the relative amounts of each desorbent component will depend upon the specific desorbent components employed and their selectivities with respect to the specific extract and raffinate components. For example, in a two component desorbent mixture, the concentration of each component may be typically greater than 0, preferably, greater than about 10, and more preferably, greater than about 40 weight percent, based on the total weight of the first and second desorbent components. For example, in a two component desorbent mixture, the concentration of each component may be typically less than 100, preferably, less than about 90, and more preferably, less than about 60 weight percent, based on the total weight of the first and second desorbent components. One skilled in the art will know how to vary the relative quantities of components of any desorbent mixture to achieve the desired separation results.

The concentration of the extract component in the extract stream comprising the extract component and the desorbent can vary widely from nearly 0 volume percent extract component to typically about 65 volume percent extract component. Likewise, the concentration of the raffinate component in the raffinate stream can vary widely from nearly 0 volume percent raffinate component to typically about 65 volume percent raffinate component. It should be appreciated that an extract component is usually not completely adsorbed by the adsorbent, and a raffinate component is usually not completely non-adsorbed by the adsorbent. Accordingly, a small quantity of the raffinate component may be present in the extract stream, and a small quantity of the extract component may be present in the raffinate stream, as described hereinafter.

In a preferred embodiment of this invention, targeted for an industrial scale process, the desorbent material is employed in a minimal quantity, so as to reduce the volume of liquids required in the process. The term "minimal quantity" shall mean that the ratio of the volume of desorbent to the volume of feed mixture is greater than about 0.5/1, but less than about 100/1 (as compared to greater than 1000/1 in analytical high pressure liquid chromatography (HPLC) methods). More preferably, the volume ratio of desorbent to feed mixture is less than about 10/1, and most preferably, less than about 2/1.

Generally, the separation method of this invention operates under liquid phase conditions. The adsorbent may be provided in a bed, typically a fixed bed, which comprises a housing or chamber that contains the adsorbent. For the purposes of this invention, the term "bed" shall also generally include subsidiary valves, pumps, and conduits for maintaining the flows of the various liquid streams, as well as any other accessories or equipment needed to implement the process. The bed may be constructed in a vertical or horizontal direction, or if desired, inclined at an angle relative to vertical or horizontal. The adsorbent in the bed may be alternately contacted with the feed mixture and the desorbent material, in which case the process will only be semi-continuous. In another embodiment, a set of two or more static beds of adsorbent may be employed with appropriate valving so that the feed mixture can be passed through one or more adsorbent beds of a set, while the desorbent material is passed through one or more other beds of the set. The flow of the feed mixture and the desorbent material may be either upwards or downwards through the adsorbent in such beds. Any conventional apparatus employed in static bed fluid-solid contacting may be used.

Moving bed or simulated moving bed flow systems, however, have a separation efficiency greater than fixed bed adsorptive systems, and are therefore preferred. In the moving bed and simulated moving bed processes, the adsorption and desorption operations are continuously taking place, which allows for both continuous productions of an extract stream and a raffinate stream and the continual use of feed and desorbent streams. One preferred embodiment of this process utilizes what is known in the art as the simulating moving bed countercurrent flow system. In such a system, it is the progressive movement of multiple liquid access points down an adsorbent column that simulates the upward movement of adsorbent contained in the column. The operating principles and sequence of such a flow system are described in D. B. Broughton's U.S. Pat. No. 2,985,589. Another embodiment of a simulated moving bed flow system suitable for use in the process of this invention is the cocurrent high efficiency simulated moving bed process disclosed in U.S. Pat. No. 4,402,832. Other moving bed flow systems, as known in the art, may also be suitable.

Adsorption conditions may vary over a wide range, provided that the separation of the triglyceride components of the oil is effected as desired. Typically, the temperature will be maintained at greater than about 18° C. Typically, the temperature will be less than about 130° C., and preferably, less than about 75° C. Most preferably, the temperature will be about ambient, taken as about 21° C. Usually, the pressure will be high enough to maintain liquid phase at the process temperature; but maintained at the minimum pressure necessary to obtain the desired flows in the various zones for a given flow configuration of adsorbent columns. Typically, the pressure is equal to or greater than about 1 atm (101 kPa). Preferably, the pressure will be less than about 100 atm (10,118 kPa), more preferably, less than about 50 atm (5,059 kPa). Desorption conditions include the same ranges of temperature and pressure as are used for adsorption conditions. The flow rates of the feed stream and desorbent stream will vary depending upon the size of the adsorbent unit, its design and operation, and the specific adsorbent and feed mixture employed. Flow rates can vary from as little as a few $cm^3$ per hour up to many thousands of gallons per hour. The size of the adsorption units that can be adapted to the process of this invention can vary anywhere from those of laboratory scale to those of pilot plant and commercial scale.

When the above-described seed oils, preferably, seed oils obtained from castor, vernonia, and lesquerella plants, are separated in accordance with the process of this invention, an extract stream and a raffinate stream are obtained, which are then further distinguished from each other and from the feed mixture by the ratio of the concentrations of the extract component and the raffinate component appearing in each particular stream. This distinction is generally referred to as "purity." More specifically, the purity of the extract component in the extract stream is calculated as the concentration of the extract component in the extract stream divided by the sum of the concentrations of the extract and raffinate components in the extract stream. Similarly, the purity of the raffinate component in the raffinate stream is calculated as the concentration of the raffinate component in the raffinate stream divided by the sum of the concentrations of the extract component and raffinate components in the raffinate stream. Recall that in this process, the extract component is the first triglyceride product; preferably, triricinolein; and the raffinate component is the second triglyceride product, preferably, diricinolein. Concentrations may be set forth in any common units, such as, grams per cubic centimeter ($g/cm^3$) or moles per liter (M). Alternatively, one may take a ratio of extract and raffinate concentrations as a measure of purity. For example, the ratio of the concentration of the more selectively adsorbed extract component to the concentration of the less selectively adsorbed raffinate component will be highest in the extract stream, next highest in the feedstream, and lowest in the raffinate stream. Likewise, the ratio of the less selectively adsorbed raffinate component to the more selectively adsorbed extract component will be highest in the raffinate stream, next highest in the feedstream, and lowest in the extract stream.

With reference to purity, the process of this invention achieves substantially pure fractions of two triglyceride products. In a preferred embodiment of this invention, the purification of a castor seed oil yields substantially pure fractions of diricinolein and triricinolein. Typically, the purity of the first triglyceride product, preferably triricinolein, in the extract stream is greater than about 60 percent, preferably, greater than about 80 percent, more preferably, greater than about 95 percent, and most preferably, greater than about 99 percent, based on the concentrations of first and second triglyceride products in the extract stream. Likewise, the purity of the second triglyceride product, preferably, diricinolein, in the raffinate stream is typically greater than about 60 percent, preferably, greater than about 80 percent, more preferably, greater than about 95 percent, and most preferably, greater than about 98 percent, based on the concentrations of the first and second triglyceride products in the raffinate stream.

If desired, the extract output stream, or at least a portion of the extract output stream, comprising desorbent and the first triglyceride product, preferably triricinolein, may be passed into a separation means, wherein a least a portion of the desorbent material will be separated under separating conditions to produce an extract product containing a reduced quantity of desorbent. Preferably, the concentration of desorbent in the extract product will be less than about 20 weight percent, more preferably, less than about 5 weight percent, and most preferably, less than about 0.5 weight percent, based on the weight of the extract product. Optionally if desired, the raffinate output stream, or at least a portion of the raffinate output stream, comprising desorbent and the second triglyceride product, preferably diricinolein, may be passed into a separation means, wherein at least a portion of the desorbent material will be separated under separating conditions to produce a raffinate product containing a reduced quantity of desorbent. Preferably, the concentration of desorbent in the raffinate product will be less than about 20 weight percent, more preferably, less than about 5 weight percent, and most preferably, less than about 0.5 weight percent, based on the weight of the raffinate product. In each instance, the separation means will typically be a fractionation column, the design and operation of which are well known to those skilled in the art.

In order to test various adsorbents and desorbents for the separation of seed oil triglyceride mixtures, a dynamic pulse testing apparatus may be employed as described hereinafter. The apparatus may consist of a chamber, for example, of approximately 100 cm length by 1 cm inner diameter, having inlet and outlet means at opposite ends of the chamber and filled with adsorbent material. The chamber is typically maintained at ambient temperature and atmospheric pressure; but means to maintain other temperatures and pressures may be employed as well. Generally, the chamber is equilibrated with the desorbent by passing the desorbent material through the adsorbent chamber for sufficient time to effect equilibration. Thereafter, a pulse of feed mixture, optionally containing a solvent or desorbent material, is injected onto the top of the adsorbent column for a suitable time, for example, a time ranging from about 15 seconds to about 2 minutes. After the feed mixture is loaded onto the adsorbent, desorbent flow is resumed, and the triglyceride components are eluted as in liquid-solid chromatography. The raffinate and extract streams can be analyzed by high-pressure liquid phase chromatography or by any other suitable means, for example, refractive index. The analysis can be made continuously on-line or incrementally by collecting aliquots of the output. Traces of the analysis as a function of time are typically developed. After the components of the oil are essentially completely eluted from the absorbent bed, a second pulse of feed mixture can be applied; and the pulse cycle can be repeated as often as desired.

The following Glossary is provided as a supplement to the description herein.

GLOSSARY

Pressure in units of pounds per square inch (psi gauge or absolute) are converted to units of kilopascals (kPa) by multiplying the psi value by 6.895. (Example: 50 psi× 6.895=345 kPa)

The term "feed mixture" refers to a seed oil comprising a mixture of triglycerides from which at least one extract product and one raffinate product are obtained.

The term "feedstream" indicates a stream comprising a seed oil that is passed to an adsorbent.

The term "extract component" is defined as a component of a feed mixture that is more selectively retained by an adsorbent, as compared with one or more other components in the feed mixture.

The term "extract stream" is defined as a stream through which an extract component, which has been desorbed, is removed from an adsorbent.

The term "desorbent material" shall refer to one or more liquid compounds that are capable of desorbing an extract component from an adsorbent.

The "desorbent input stream" shall indicate a stream through which the desorbent passes into an adsorbent.

The term "raffinate component" is defined as a component of a feed mixture that is less selectively adsorbed by an adsorbent, as compared with one or more other components in the feed mixture.

The term "raffinate stream" is defined as a stream through which a raffinate component is removed from an adsorbent.

The term "extract product" is defined as a product obtained on removing a desorbent from an extract stream.

The term "raffinate product" is defined as a product obtained on removing a desorbent from a raffinate stream.

The following example is provided for illustrative purposes. References to specific seed oils, adsorbents, desorbent materials, and operating conditions are not intended to restrict the scope and spirit of the invention. In light of the disclosure herein, those of skill in the art will recognize alternative embodiments of the invention that fall within the scope of the attached claims.

EXAMPLE 1

An absorbent column was prepared by packing two glass, water jacketed columns (1 cm inner diameter by 50 cm length each), connected in series with a total length of 100 cm, with a commercial silica (Aldrich, 100–200 U.S. mesh, 150–75 micron particle size range, 60 Angstrom pore size). No water was flowing through the water jackets. The column was maintained at room temperature throughout the experiment. A 0.5 ml/min flow of desorbent input stream, consisting of 50 weight percent ethyl acetate and 50 weight percent n-hexane, was established through the column from top to bottom by means of a pump. After desorbent flow was established for about 30 min, the flow was stopped and replaced with a feed stream consisting of castor oil (100 percent) at a flow rate of 0.5 ml/min. The castor oil flow was maintained for about 45 sec, which resulted in a loading of 0.375 ml of castor oil onto the top of the adsorbent bed. Then, the flow of castor oil was stopped, and the flow of desorbent input stream was re-established. Throughout the process, the pressure at the outlet of the column was essentially atmospheric. The pressure at the inlet of the column was not controlled; but since the flow rate was slow, the pressure at the inlet was not expected to be significantly above atmospheric. The desorbent output stream obtained from the bottom of the column was analyzed as a function of time by passing the desorbent output stream through a refractive index detector for qualitative analysis of the products and for determination of the degree of separation obtained. A first peak eluting from the column was taken as the raffinate output stream; a second peak eluting from the column was taken as the extract output stream. When the output stream showed that essentially all of the components of the first injection of castor oil had eluted through the adsorbent bed, the pulse sequence was repeated with a second loading of castor oil and a second desorbent operation. The sequence was repeated for a total of six pulses.

Figure 2:
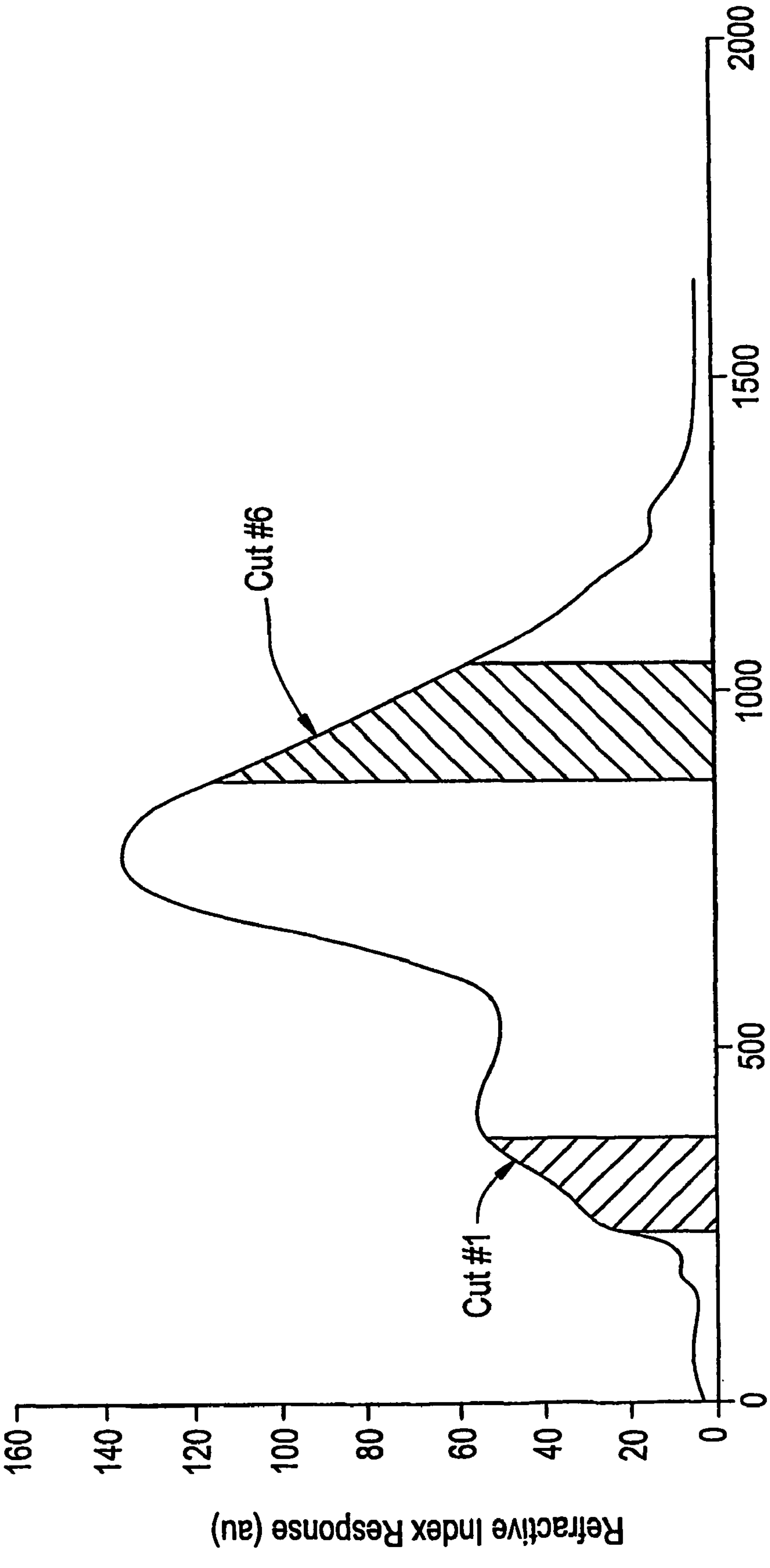
FIG. 2 is a chromatographic trace in greater detail of a refractive index detector output as a function of time for the fourth injection of Example 1.

FIG. 1 shows the refractive index detector output for the six pulses, described hereinabove. In FIG. 1 the units for refractive index response and for time are simply given in arbitrary units (au) of increasing value along the two axes. The existence of two peaks in the detector trace indicates the separation of the castor oil feed into its two triglyceride components. The similarity in the traces of the six runs illustrates the reproducibility of the separation. FIG. 2 shows in higher detail the refractive index detector output from the fourth injection. Again, the units along the refractive index and time axes are arbitrary units of increasing value. Multiple fractions of the fourth injection were collected throughout the pulse. Cut #1 and Cut #6, shown in FIG. 2, were analyzed by high pressure liquid chromatography for diricinolein and triricinolein. Cut #1 (analogous to raffinate stream) was found to contain essentially diricinolein (6,128 mg/liter) with only a small amount of triricinolein (51 mg/liter). Accordingly, the diricinolein fraction had a purity of greater than 99.0 weight percent. Cut #2 (analogous to extract stream) was found to contain essentially triricinolein (11,220 mg/liter) with only a small trace of diricinolein (17 mg/liter). The triricinolein fraction had a purity of greater than 99.8 weight percent.

What is claimed is:

1. A process of separating a plant oil comprising a mixture of triglyceride esters, the process comprising (a) contacting a seed oil, whose fatty acid composition comprises predominantly one principle fatty acid selected from ricinoleic, vernolic, and lesquerolic acids, at adsorption conditions with an adsorbent bed, the adsorbent having a particle size greater than about 40 microns, such that a first triglyceride product, characterized as having three fatty acids each identical to the principle fatty acid in the oil, is adsorbed more selectively by the adsorbent, as compared with a second triglyceride product, characterized as having either two, one, or no fatty acids identical to the principle fatty acid in the oil; (b) removing the second triglyceride product by withdrawing from the adsorbent a raffmate stream comprising predominantly the second triglyceride product; (c) desorbing the first triglyceride product by contacting the adsorbent containing the first triglyceride product with a desorbent under desorbent conditions sufficient to yield an extract stream comprising predominantly first triglyceride product and desorbent.

2. The process of claim 1 wherein the second triglyceride product is characterized as having two fatty acids identical to the principle fatty acid in the oil.

3. The process of claim 2 wherein the seed oil is selected from the group consisting of castor, vernonia, and lesquerella plants.

4. The process of claim 3 wherein the seed oil is a castor plant oil, and wherein the castor oil has a fatty acid composition comprising from about 85 to about 90 percent ricinoleic acid, from about 3 to about 5 percent linolenic acid, from about 2 to about 5 percent oleic acid, from about 1 to about 3 percent palinitic acid, from about 1 to about 2 percent stearic acid, and about 1 (±0.3) percent dihydroxy stearic acid, by weight.

5. The process of claim 3 wherein the seed oil is a vernoma plant oil, and wherein the vemoma plant oil has a fatty acid composition comprising from about 60 to about 77 percent vernolic acid; from about 0.1 to about 0.4 percent linolenic acid; from about 9 to about 13 percent linoleic acid; from about 4 to about 20 percent oleic acid; and from about 2 to about 4 percent stearic acid, by weight.

6. The process of claim 3 wherein the seed oil is a lesquerella plant oil, and wherein the lesquerella plant oil has a fatty acid composition comprising greater than about 50 to about 75 percent lesquerolic acid; from about 1 to about 13 percent linolenic acid; from about 3 to about 8 percent linoleic acid; from about 11 to about 27 percent oleic acid; from about 1 to about 6 percent stearic acid; and from about 1 to about 6 percent palmitic acid, by weight.

7. The process of claim 1 wherein the seed oil is applied as a neat liquid to the adsorbent.

8. The process of claim 1 wherein the seed oil is applied in a solution to the adsorbent, and wherein the solution contains the seed oil in a concentration of greater than about 50 volume percent.

9. The process of claim 8 wherein the solution is prepared with a solvent selected from mixtures of $C_{1-10}$ aliphatic hydrocarbons and $C_{1-6}$ acetates.

10. The process of claim 1 wherein the adsorbent is selected from silicas, aluminas, silica-aluminas, clays, molecular sieves, zeolites, crystalline mesoporous aluminosilicates, and reticular synthetic polymeric resins.

11. The process of claim 1 wherein the adsorbent is silica.

12. The process of claim 1 wherein the adsorbent is porous with a pore size of greater than about 45 Angstroms and less than about 200 Angstroms in diameter or cross-sectional dimension.

13. The process of claim 1 wherein the adsorbent, or a composite formed from the adsorbent and a binder, has a particle size of greater than about 70 microns and less than about 800 microns in diameter (or critical dimension).

14. The process of claim 1 wherein the desorbent is selected from aliphatic hydrocarbons, chlorinated aliphatic hydrocarbons, aromatic hydrocarbons, chlorinated aromatic hydrocarbons, alcohols, esters, ketones, and mixtures thereof.

15. The process of claim 1 wherein the desorbent is a mixture of a $C_{1-10}$ aliphatic hydrocarbon and a $C_{1-6}$ acetate.

16. The process of claim 1 wherein the adsorption and desorption steps are conducted at a temperature of greater than about 18° C. and less than about 130° C.

17. The process of claim 1 wherein the adsorption and desorption steps are conducted at a pressure equal to or greater than about 1.0 atm (101 kPa) and less than about 100 atm (10,118 kPa).

18. The process of claim 1 wherein the volume of desorbent to volume of feed mixture is greater than about 0.5/1 and less than about 100/1.

19. The process of claim 1 wherein the process is conducted in a moving bed or simulated moving bed flow system.

20. The process of claim 1 wherein the first triglyceride product is triricinolein, and the second triglyceride product is diricinolein.

21. The process of claim 1 wherein the first triglyceride product is obtained in a purity of greater than about 95 weight percent, and the second triglyceride product is obtained in a purity of greater than about 95 weight percent.

22. The process of claim 1 wherein the fatty acid composition of the seed oil comprises greater than 70 weight percent of the one principle fatty acid selected from ricinoleic, vernolic, and lesquerolic acids.

23. A process of separating a mixture of triglycerides obtainable from castor oil, the process comprising contacting a castor seed oil as a neat liquid with a silica adsorbent in a bed, the adsorbent having a particle size of greater than about 40 microns and less than about 800 microns, and optionally, having a pore size of greater than about 45 Angstroms and less than about 200 Angstroms in diameter; the contacting being conducted at adsorption conditions such that a first triglyceride, triricinolein, is selectively adsorbed onto the adsorbent as compared with a second triglyceride, diricinolein; contacting the adsorbent with a desorbent material comprising a mixture of hexane and ethyl acetate, and thereafter withdrawing a raffmate output stream comprising predominantly diricinolein and desorbent from said adsorbent, the diricinolein having a purity of greater than about 80 percent; thereafter contacting the desorbent material comprising a mixture of hexane and ethyl acetate with the adsorbent under desorbent conditions sufficient to withdrawn an extract stream comprising predominantly triricinolein and desorbent from the adsorbent, the triricinolein having a purity of greater than about 80 percent.

24. The process of claim 23 wherein the process is conducted in a moving bed or simulated moving bed flow system.

* * * * *